(12) United States Patent
Murakami et al.

(10) Patent No.: US 7,989,112 B2
(45) Date of Patent: Aug. 2, 2011

(54) FUEL CELL SYSTEM AND PURGING METHOD THEREFOR

(75) Inventors: Yoshikazu Murakami, Utsunomiya (JP); Shinji Yoshikawa, Utsunomiya (JP); Hiroyuki Abe, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 723 days.

(21) Appl. No.: 11/102,176

(22) Filed: Apr. 8, 2005

(65) Prior Publication Data
US 2005/0271918 A1 Dec. 8, 2005

(30) Foreign Application Priority Data
Apr. 12, 2004 (JP) .................................. 2004-116760

(51) Int. Cl.
*H01M 8/04* (2006.01)
(52) U.S. Cl. .................... 429/443; 429/428; 429/479
(58) Field of Classification Search .................. None
See application file for complete search history.

(56) References Cited

U.S. PATENT DOCUMENTS

| | | | |
|---|---|---|---|
| 6,479,177 B1 | 11/2002 | Roberts et al. | |
| 6,835,479 B2 * | 12/2004 | Balliet et al. | 429/13 |
| 7,109,855 B2 * | 9/2006 | Appt et al. | 340/438 |
| 7,270,904 B2 * | 9/2007 | Yu et al. | 429/24 |
| 7,291,411 B2 * | 11/2007 | Pettit et al. | 429/13 |
| 2002/0076583 A1 | 6/2002 | Reiser et al. | |
| 2003/0082433 A1 | 5/2003 | Sano et al. | |
| 2003/0180583 A1 * | 9/2003 | Ichikawa et al. | 429/9 |
| 2003/0228504 A1 * | 12/2003 | Konrad et al. | 429/13 |
| 2004/0115488 A1 * | 6/2004 | Sanagi et al. | 429/12 |
| 2004/0137292 A1 * | 7/2004 | Takebe et al. | 429/23 |
| 2004/0197614 A1 * | 10/2004 | Simpson et al. | 429/17 |

FOREIGN PATENT DOCUMENTS

| | | |
|---|---|---|
| JP | 2000-512068 | 9/2000 |
| JP | 2001-143736 | 5/2001 |
| JP | 2002-208421 | 7/2002 |
| JP | 2002-208422 | 7/2002 |
| JP | 2002-208429 | 7/2002 |
| JP | 2002-329521 | 11/2002 |
| JP | 2003-92126 | 3/2003 |

(Continued)

OTHER PUBLICATIONS

Japanese Office Action for Application No. 2004-381013, dated Feb. 26, 2008.
Japanese Office Action for Application No. 2004-116760, dated Sep. 29, 2009.
Japanese Office Action for Application No. 2004-116760, dated Jul. 6, 2010.

*Primary Examiner* — Barbara L Gilliam
*Assistant Examiner* — Maria J Laios
(74) *Attorney, Agent, or Firm* — Nelson Mullins Riley & Scarborough LLP; Anthony A. Laurentano; Matthew T. Fagan

(57) ABSTRACT

A fuel cell system includes a fuel cell having a membrane, which is adapted to perform power generation by a chemical reaction of two reaction gases each supplied to one side of the membrane, reaction gas paths through which the two reaction gases flow, a purge device for purging at least one of the two reaction gases from the reaction gas paths, a monitoring device for monitoring a state of the fuel cell after stopping of the power generation in the fuel cell, and a control unit for controlling the purge device so as to carry out a purge operation when it is determined by the monitoring device that the state of the fuel cell is a predetermined state.

13 Claims, 3 Drawing Sheets

FOREIGN PATENT DOCUMENTS

| | | |
|---|---|---|
| JP | 2003-510786 | 3/2003 |
| JP | 2003-203665 | 7/2003 |
| JP | 2004-4013 | 1/2004 |
| JP | 2004-22198 | 1/2004 |
| JP | 2004-22460 | 1/2004 |
| JP | 2004-39527 | 2/2004 |
| JP | 2004-152600 | 5/2004 |
| JP | 2004-193102 | 7/2004 |

* cited by examiner

FUEL CELL SYSTEM AND PURGING METHOD THEREFOR

BACKGROUND OF THE INVENTION

1. Field of the Invention

The present invention relates to a fuel cell system which is adapted for cold start-up, and also relates to a purging method for a fuel cell system.

Priority is claimed on Japanese Patent Application No. 2004-116760, filed Apr. 12, 2004, the content of which is incorporated herein by reference.

2. Description of the Related Art

In recent years, fuel cell powered vehicles have been proposed, each of which includes a fuel cell system as a driving power source of the vehicle. As a type of fuel cell system for such vehicles, a fuel cell system is known which includes a predetermined number of stacked cell units, each of which includes an anode electrode, a cathode electrode, and an electrolyte membrane sandwiched therebetween. When hydrogen is supplied to the anode electrode and air (oxygen) is supplied to the cathode electrode, electrical power generation occurs via an electrochemical reaction of hydrogen and oxygen which is accompanied by producing of water. Even though water is mainly formed at the cathode electrode during operation of the fuel cell system, a portion of the water at the cathode electrode may move to the anode through the electrolyte membrane sandwiched between the cathode and the anode.

When the power generation of the fuel cell system is to be stopped, the above-mentioned formed water and humidifying water remain in gas flow paths of the fuel cell units; therefore, when the power generation is stopped while water remains therein, the remaining water may freeze at low temperature, and the frozen water (ice) may block supply and discharge of the reaction gases (hydrogen and air), which leads to degradation of start-up performance at low temperature.

To solve such problem, Japanese Unexamined Patent Application, First Publication No. 2003-203665 proposes a fuel cell system in which a purging operation is carried out in at least one of an anode electrode region and a cathode electrode region when power generation is stopped.

However, in the case in which the fuel cell system is restarted within a short period after stopping of power generation, or in the case in which the temperature of the fuel cell system does not fall significantly because the fuel cell system is used under warm conditions such as in summer, such a purging operation need not be carried out when power generation is stopped. If the purging operation is carried out at every stop of power generation, even under such conditions, endurance of membranes included in the fuel cell may be reduced, and operational life of the fuel cell may be reduced.

Moreover, if the purging operation is carried out at every stop of the power generation, the operation of the fuel cell system is continued for carrying out the purging operation even when the fuel cell powered vehicle stops completely; therefore, the passengers in the vehicle may have unusual sensations, which may degrade the product value of the vehicle.

SUMMARY OF THE INVENTION

In consideration of the above circumstances, an object of the present invention is to provide a fuel cell system in which reduction in the operational life of the fuel cell is prevented by sufficiently maintaining endurance of the membranes, and with which the product value of the vehicle is enhanced. Another object of the present invention is to provide a purging method for a fuel cell system.

In order to achieve the above objects, the present invention provides a fuel cell system including: a fuel cell having a membrane, which is adapted to perform power generation by a chemical reaction of two reaction gases each supplied to both sides of the membrane; reaction gas paths through which the two reaction gases flow; a purge device for purging at least one of the two reaction gases from the reaction gas paths; a monitoring device for monitoring a state of the fuel cell after stopping of the power generation in the fuel cell; and a control unit for controlling the purge device so as to carry out a purge operation when it is determined by the monitoring device that the state of the fuel cell is a predetermined state.

According to the above fuel cell system, the membranes in the fuel cell can be protected from excessive fluctuation of pressure because a state of the fuel cell after stopping of the power generation in the fuel cell is monitored by the monitoring device, and a purge operation is carried out only when it is determined that the fuel cell is in a state in which the purge operation is necessary, i.e., because unnecessary purge operations will not be carried out. Moreover, because the purge operation will not be carried out immediately after stopping of the power generation in the fuel cell, the passengers in the vehicle will not have unusual sensations.

The above fuel cell system may further include a timer for measuring an elapsed time since the stopping of the power generation in the fuel cell, wherein the monitoring device is activated, so as to determine the state of the fuel cell, at a predetermined timing based on the elapsed time measured by the timer.

According to the above fuel cell system, because the monitoring device is activated at a predetermined timing, electrical energy consumed to monitor the state of the fuel cell can be reduced, and thus fuel economy can be improved.

In the above fuel cell system, the monitoring device may include a temperature sensor for measuring a temperature of the fuel cell, and the predetermined state may be a state in which the temperature of the fuel cell measured by the temperature sensor is below a temperature at which water vapor is condensed to water in the reaction gas paths.

According to the above fuel cell system, if the predetermined temperature for triggering execution of the purge operation is set below a temperature at which water is condensed in the reaction gas paths, water vapor contained in the gas remaining in the reaction gas paths is condensed when the temperature of the fuel cell falls below the predetermined temperature. Because the purge operation is carried out at this stage, the gas purged from the fuel cell system does not contain an excessive amount of water content, and thus the purge operation is efficiently carried out.

In the above fuel cell system, the monitoring device may include a pressure sensor for measuring a pressure in the fuel cell, and the predetermined state may be a state in which the pressure in the fuel cell measured by the pressure sensor is below a predetermined value which is set based on a relationship between the pressure in the fuel cell and condensation of water vapor in the reaction gas paths.

The above fuel cell system may further include a merging path connecting the reaction gas paths and a regulation valve provided in the merging path, wherein the control unit may further control the regulation valve during the purge operation.

In the above fuel cell system, the reaction gas paths may include a hydrogen gas supply path and an air supply path, and the control unit may control the regulation valve during the purge operation so that air in the air supply path is introduced into the hydrogen gas supply path.

The present invention further provides a purging method for a fuel cell system having a fuel cell and reaction gas paths, the purging method including stopping power generation in the fuel cell, monitoring a state of the fuel cell after stopping of the power generation, and carrying out a purge operation so as to purge residual gas in the reaction gas paths when it is determined that the state of the fuel cell is a predetermined state.

The above purging method may further include measuring an elapsed time since the stopping of the power generation, wherein the monitoring of the state of the fuel cell may be started when a predetermined time has elapsed since the stopping of the power generation.

In the above purging method, a temperature of the fuel cell may be measured during the monitoring of the state of the fuel cell, and the predetermined state may be a state in which the temperature of the fuel cell is below a temperature at which water vapor is condensed to water in the reaction gas paths.

In the above purging method, a pressure in the fuel cell may be measured during the monitoring of the state of the fuel cell, and the predetermined state may be a state in which the pressure in the fuel cell is below a predetermined value which is set based on a relationship between the pressure in the fuel cell and condensation of water vapor in the reaction gas paths.

The above purging method may further include controlling a regulation valve during the purge operation, the regulation valve provided in a merging path connecting the reaction gas paths.

The above purging method may further include introducing air in an air supply path, which is one of the reaction gas paths, into a hydrogen gas supply path, which is the other of the reaction gas paths, during the purge operation.

DESCRIPTION OF THE PREFERRED EMBODIMENTS

An embodiment of a fuel cell system according to the invention will be explained below with reference to the appended drawings.

Figure 1:
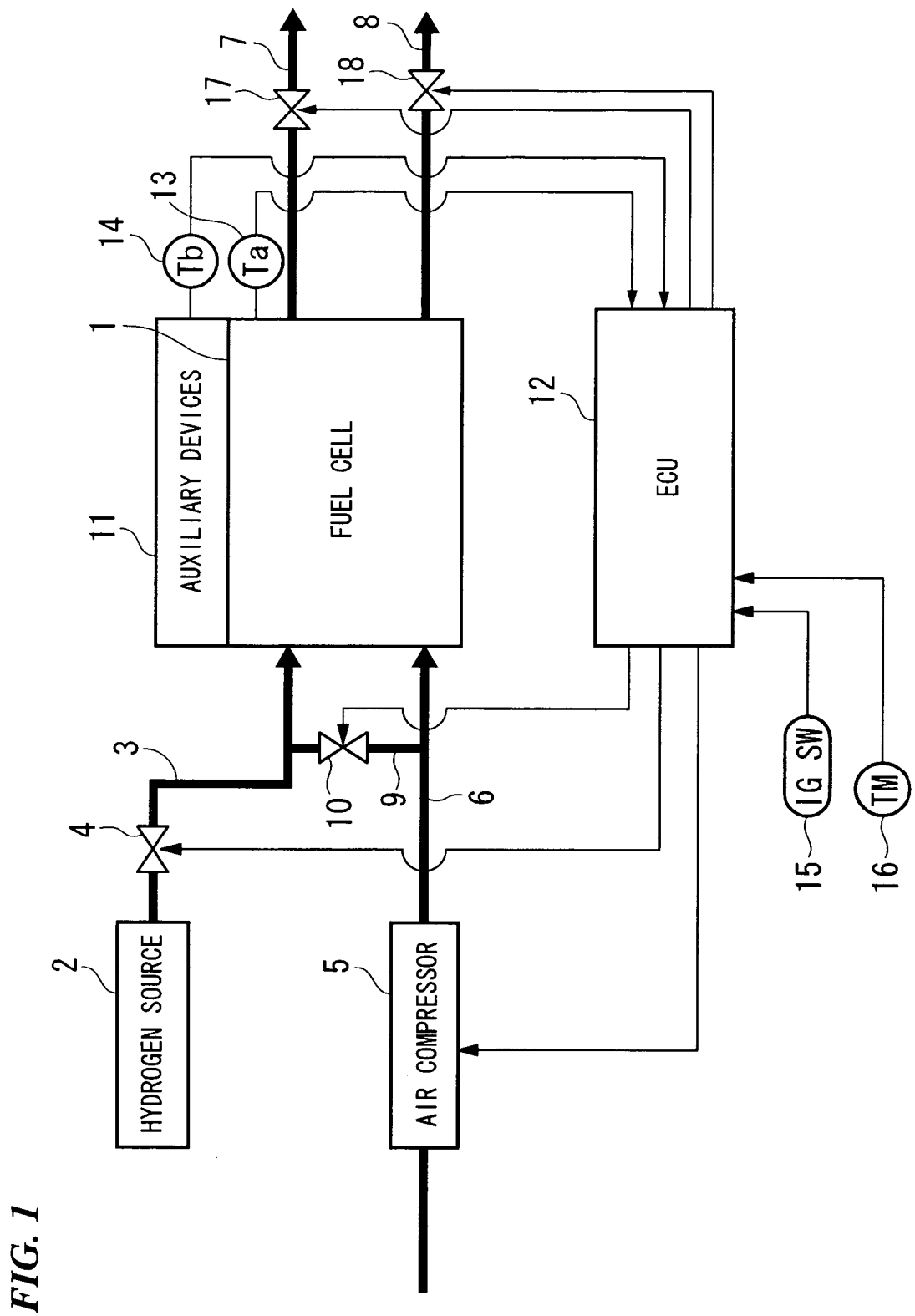
FIG. 1 is a schematic block diagram showing a fuel cell system according to an embodiment of the present invention.

FIG. 1 is a schematic block diagram showing a fuel cell system in the embodiment of the present invention.

A fuel cell 1 is a stack that is formed by stacking a plurality of fuel cell units, each of which includes a solid polymer electrolyte membrane consisting of, for example, a solid polymer ion exchange membrane, and an anode and a cathode that sandwich the solid polymer electrolyte membrane therebetween.

When hydrogen as a fuel gas is supplied to the anode of the fuel cell 1 constructed as described above, and air containing oxygen as an oxidizing gas is supplied to the cathode thereof, hydrogen ions are produced in the anode area by catalytic reaction, which pass through the solid polymer electrolyte membrane, and which reach the cathode area where the hydrogen ions electrochemically react with oxygen so that electrical power is generated, and water is formed. Because a portion of the water formed in the cathode area permeates the solid polymer electrolyte membrane so as to diffuse into the anode area, there is also water in the anode area.

A hydrogen gas supplied from a hydrogen supply source 2, such as a hydrogen tank, is supplied to the anode of the fuel cell 1 via a shutoff valve 4 and a hydrogen gas supply path 3.

Air is pressurized by an air compressor 5, and then is supplied to the cathode of the fuel cell 1 through an air supply path 6.

The hydrogen gas supply path 3 and the air supply path 6 are connected to each other via a merging path 9. The merging path 9 is provided with a regulation valve 10. Whether merging of reaction gases (i.e., hydrogen and air) which flow through the paths 3 and 6 is allowed or not can be controlled by opening or closing the regulation valve 10.

The hydrogen gas and air supplied to the fuel cell 1 are used for power generation, and are respectively discharged as an off-gas from the fuel cell 1 to a hydrogen discharge path 7 and an air discharge path 8 along with residual water such as condensed water formed in the anode area.

The hydrogen discharge path 7 is provided with a hydrogen purge valve 17, and the air discharge path 8 is provided with an air purge valve 18. When the purge valves 17 and 18 are opened, the off-gas, i.e., hydrogen and air remaining after the reaction, and residual water are discharged through the hydrogen discharge path 7 and the air discharge path 8. The hydrogen discharged through the hydrogen discharge path 7 is diluted in a dilution unit (not shown) to a level lower than a predetermined concentration; however, detailed descriptions are omitted.

The fuel cell system is provided with a control unit 12 (hereinafter referred to as an ECU 12) which controls various devices.

An ignition switch 15 and a timer 16 are connected to the ECU 12 so that signals indicating ON and OFF states of the ignition (IG-ON, IG-OFF) and signals indicating measured time are input to the ECU 12.

Moreover, the fuel cell 1 is provided with a temperature sensor 13, and auxiliary devices (e.g., pipes, valves, etc.) are provided with a temperature sensor 14. Temperatures Ta and Tb measured respectively by the temperature sensors 13 and 14 are input to the ECU 12.

The ECU 12 outputs signals for driving the air compressor 5, the shutoff valve 4, the regulation valve 10, and the purge valves 17 and 18 based on the aforementioned signals input to the ECU 12.

The operations of the fuel cell system constructed as described above will be explained below with reference to FIGS. 2 and 3.

Figure 2:
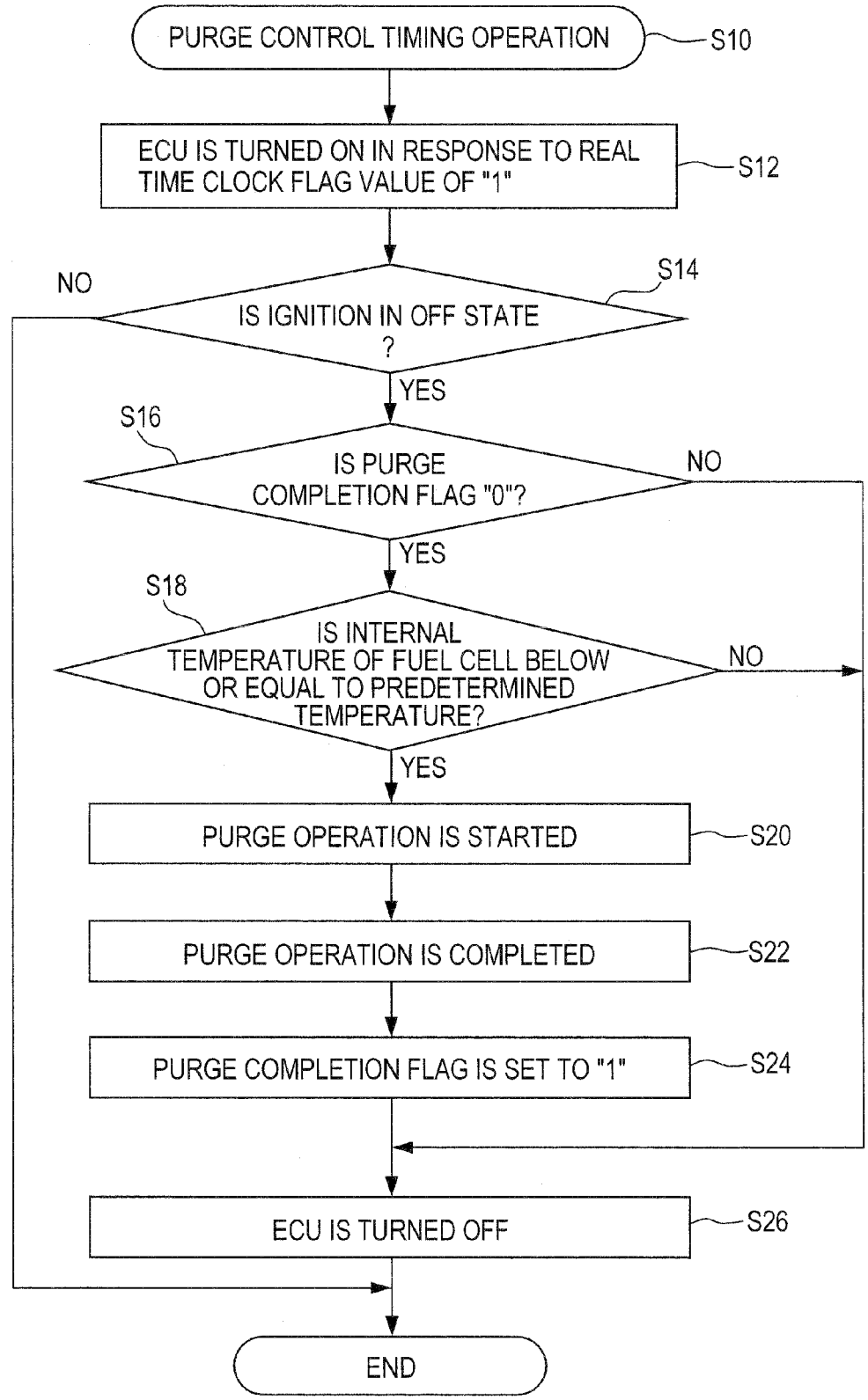
FIG. 2 is a flowchart showing processes for a purge control timing operation for the fuel cell system shown in FIG. 1.
Figure 3:
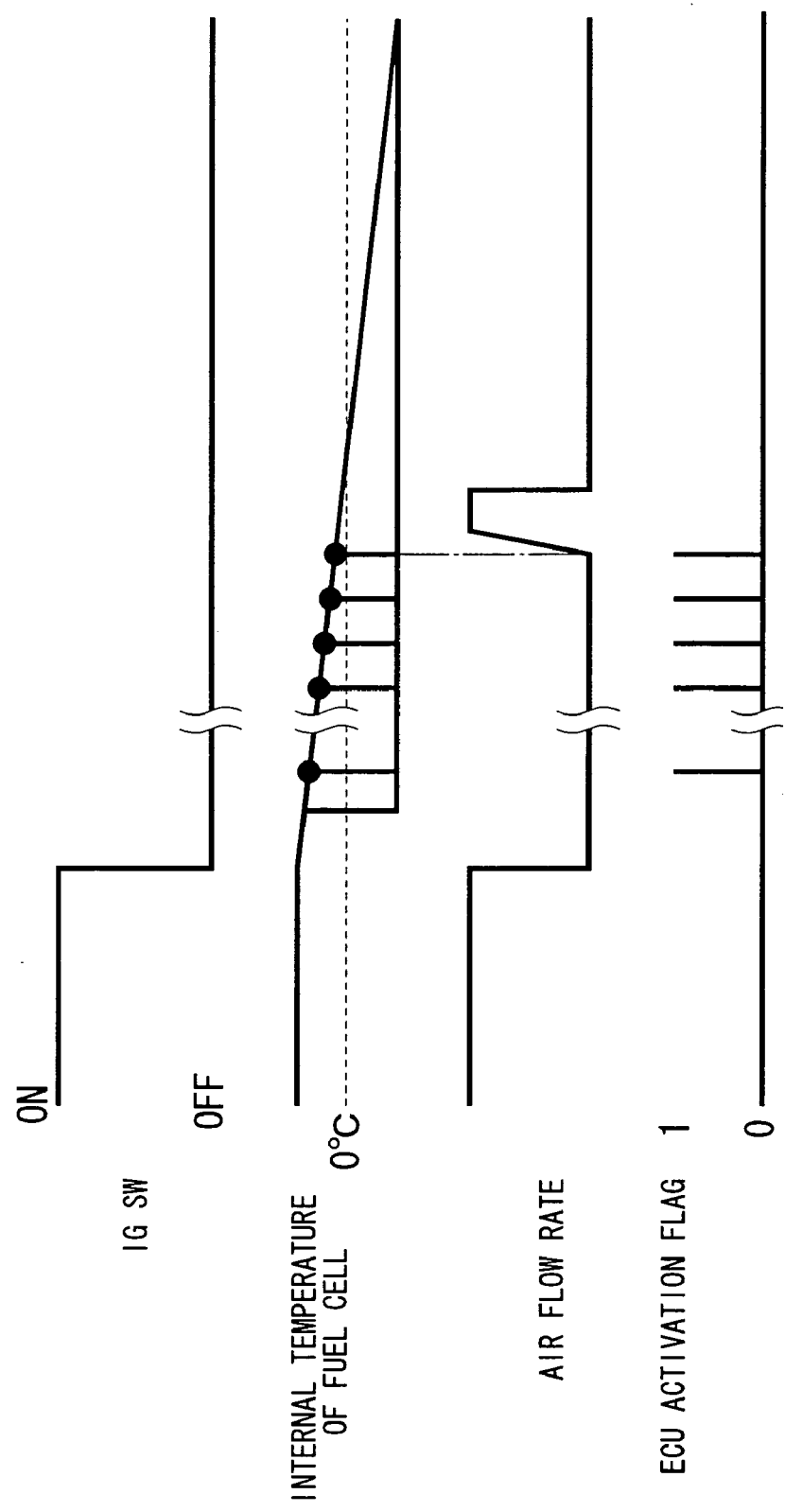
FIG. 3 is a time chart showing time-domain changes in a state of an ignition switch, an internal temperature of the fuel cell, an air flow rate, and an ECU activation flag.

FIG. 2 is a flowchart showing processes for a timed purge control operation. FIG. 3 is a time chart showing time-domain changes in a state of an ignition switch, an internal temperature of the fuel cell, an air flow rate, and an ECU activation flag.

When the ignition switch 15 is turned OFF, power generation in the fuel cell 1 is stopped, the operation of the air compressor 51 is stopped, and the shutoff valve 4 in the hydrogen gas supply path 3 is closed, and then the purge control timing operation indicated by S10 is started. Upon starting of the control operation, the timer 16 is reset and starts measurement of time. When a predetermined time has elapsed since stopping of the fuel cell 1, the timer 16 sends a signal indicating a real time clock flag value of "1" to the ECU 12 in step S12, and the ECU 12 is started up in response to this signal. The predetermined time may be selected in accordance with, for example, temperature of atmosphere, temperature of the fuel cell 1, etc.

In step S14, it is determined whether the ignition is in the OFF (i.e., IG-OFF) state based on the signal input from the ignition switch 15. When the result of the determination is "YES", the operation proceeds to step S16, and when the result of the determination is "NO", the operation is terminated. Such a control operation is provided because the purge operation need not be carried out if the ignition is turned ON (i.e., IG-ON) within a short period after stopping of the power generation in the fuel cell 1, i.e., when the temperature of the fuel cell 1 is maintained at a relatively high level.

In step S16, it is determined whether a purge completion flag is "0". As will be further explained below, the purge completion flag indicates whether a purge operation has been completed after stopping of the power generation in the fuel cell 1, and more specifically, a flag value of "1" indicates that the purge operation is completed, and a flag value of "0" indicates that the purge operation has not been completed. When the result of the determination in step S16 is "YES", the operation proceeds to step S18, and when the result of the determination is "NO", the operation proceeds to step S26 of which explanation will be given separately.

In step S18, it is determined whether the internal temperature Ta of the fuel cell 1, which is measured by the temperature sensor 13, is below or equal to a predetermined temperature. When the result of the determination is "YES", the operation proceeds to step S20, and when the result of the determination is "NO", the operation proceeds to step S26. It is preferable that the predetermined temperature for determination be set below a temperature at which water is condensed in the hydrogen discharge path 7 and the air discharge path 8, which are reaction gas paths. The temperature Tb of the auxiliary device 11 of the fuel cell 1 is also measured using the temperature sensor 14. The temperature Tb may also be taken into account for the above determination.

When the result of the determination in step S18 is "YES", i.e., the internal temperature of the fuel cell 1 is below the predetermined value, the purge valves 17 and 18 are opened, and the air compressor 5 is operated, in step S20, so that the purge operation is started. If the regulation valve 10 in the merging path 9 is opened at this stage so that air is also supplied to the hydrogen gas supply path 3, the purge operation is carried out not only at the cathode area but also at the anode area. Accordingly, the purge operation is carried out at the anode area without consuming hydrogen.

After carrying out the purge operation, the purge valves 17 and 18 are closed in step S22 so that the purge operation is finished. Whether the purge operation has been completed may be determined by comparing elapsed time with a predetermined time length for the purge operation. Alternatively, the determination may be made based on humidity in at least one of the fuel cell 1 and the auxiliary devices 11, the humidity being measured by a humidity sensor. In step S24, the purge completion flag, which indicates completion of the purge operation, is set to "1". In step S26, the ECU is turned OFF, and the series of the control operations is once terminated.

As explained above, in this embodiment, the membranes in the fuel cell 1 can be protected from excessive fluctuation of pressure because the purge operation is carried out only when it is necessary, i.e., because unnecessary purge operations will not be carried out. Moreover, because the purge operation will not be carried out immediately after stopping of the power generation in the fuel cell 1, the passengers in the vehicle will not have unusual sensations.

In addition, because the ECU 12 is started-up at a predetermined timing, electrical energy consumed to monitor the state of the fuel cell 1 can be reduced, and thus fuel economy can be improved.

Furthermore, if the predetermined temperature for determining execution of the purge operation is set below a temperature at which water is condensed in the hydrogen discharge path 7 and the air discharge path 8, which are reaction gas paths, water vapor contained in the gas remaining in the hydrogen discharge path 7 and the air discharge path 8 is condensed when the temperature of the fuel cell 1 falls below the predetermined temperature. Because the purge operation is carried out at this stage, the gas purged from the fuel cell system does not contain an excessive amount of water content, and thus the purge operation is efficiently carried out. In addition, because water vapor contained in the gas has been condensed, condensation of water after the purge operation is completed can be prevented.

While preferred embodiments of the invention have been described and illustrated above, it should be understood that these are exemplary of the invention and are not to be considered as limiting.

For example, in order to monitor the state of the fuel cell 1, pressure in the fuel cell 1 may also be measured in addition to the internal temperature, and a pressure signal may be used for the purge control operation. Moreover, the timer 16 may be provided in the ECU 12 instead of being provided separately from the ECU 12.

Further additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell system comprising:
   a fuel cell having a membrane, which generates power by a chemical reaction of two reaction gases, each supplied to one side of the membrane;
   reaction gas paths through which the two reaction gases flow;
   a purge device for purging at least one of the two reaction gases from the reaction gas paths;
   a purging operation detection device for determining whether a purging operation has been carried out during a stoppage of the fuel cell;
   a monitoring device for monitoring a state of the fuel cell; and
   a control unit programmed to direct the purge device to carry out a purge operation when the monitoring device determines that the fuel cell is in the predetermined state, wherein
   the control unit provides first and second indicators, the first indicator associated with a state wherein a purge has not occurred during said stoppage of the fuel cell and the second indicator associated with a state wherein a purge has occurred during said stoppage of the fuel cell, the control unit setting the second indicator when a purge operation is carried out, and further that the monitoring device only monitors the state of the fuel cell if the first indicator is present, and the monitoring device does not monitor the state of the fuel cell if the second indicator is present so that multiple purges are not carried out during said stoppage of the fuel cell.

2. A fuel cell system according to claim 1, further comprising a timer for measuring an elapsed time since the fuel cell was turned to the off state, wherein the monitoring device is activated, so as to determine the state of the fuel cell, at a predetermined timing based on the elapsed time measured by the timer.

3. A fuel cell system according to claim 1, wherein the monitoring device comprises a temperature sensor for measuring a temperature of the fuel cell, and the predetermined state is a state in which the temperature of the fuel cell measured by the temperature sensor is below a temperature at which water vapor is condensed to water in the reaction gas paths.

4. A fuel cell system according to claim 1, wherein the monitoring device comprises a pressure sensor for measuring a pressure in the fuel cell, and the predetermined state is a state in which the pressure in the fuel cell measured by the pressure sensor is below a predetermined value which is set based on a relationship between the pressure in the fuel cell and condensation of water vapor in the reaction gas paths.

5. A fuel cell system according to claim 1, further comprising:

a merging path connecting the reaction gas paths; and
a regulation valve provided in the merging path,
wherein the control unit further controls the regulation valve during the purge operation.

6. A fuel cell system according to claim 5, wherein the reaction gas paths comprise a hydrogen gas supply path and an air supply path, and the control unit controls the regulation valve during the purge operation so that air in the air supply path is introduced into the hydrogen gas supply path.

7. A purging method for a fuel cell system having a fuel cell and reaction gas paths, the purging method comprising:

turning the fuel cell to an off state to effect a stoppage of the fuel cell;
providing first and second indicators, the first indicator associated with a state wherein a purge has not occurred during said stoppage of the fuel cell and the second indicator associated with a state wherein a purge has occurred during said stoppage of the fuel cell;
setting the second indicator when a purge operation is carried out during said stoppage of the fuel cell;
monitoring the state of the fuel cell to determine whether the fuel cell is in a predetermined state if the first indicator is present, and not monitoring the state of the fuel cell if the second indicator is present; and
carrying out a purge operation so as to purge residual gas in the reaction gas paths when it is determined by the monitoring that the state of the fuel cell is the predetermined state.

8. A purging method for a fuel cell system according to claim 7, further comprising:

measuring an elapsed time since the fuel cell was turned to the off state,
wherein the monitoring of the state of the fuel cell is started when a predetermined time has elapsed since the fuel cell was turned to the off state.

9. A purging method for a fuel cell system according to claim 7, wherein a temperature of the fuel cell is measured during the monitoring of the state of the fuel cell, and the predetermined state is a state in which the temperature of the fuel cell is below a temperature at which water vapor is condensed to water in the reaction gas paths.

10. A purging method for a fuel cell system according to claim 7, wherein a pressure in the fuel cell is measured during the monitoring of the state of the fuel cell, and the predetermined state is a state in which the pressure in the fuel cell is below a predetermined value which is set based on a relationship between the pressure in the fuel cell and condensation of water vapor in the reaction gas paths.

11. A purging method for a fuel cell system according to claim 7, further comprising controlling a regulation valve during the purge operation, the regulation valve provided in a merging path connecting the reaction gas paths.

12. A purging method for a fuel cell system according to claim 11, further comprising introducing air in an air supply path, which is one of the reaction gas paths, into a hydrogen gas supply path, which is the other of the reaction gas paths, during the purge operation.

13. A purging method for a fuel cell system having:

a fuel cell;
a hydrogen supply source from which hydrogen is supplied to the fuel cell through a hydrogen gas supply path;
a compressor supplying air to the fuel cell through an air supply path;
a regulation valve provided between the hydrogen gas supply path and the air supply path;
a purge valve purging a reaction gas;
a purge operation detection device for determining whether a purging operation has been carried out; and
a monitoring device monitoring a state of the fuel cell, the purging method comprising:
directing the fuel cell to stop generating power to effect a stoppage of the fuel cell;
providing first and second indicators, the first indicator associated with a state wherein a purge has not occurred during said stoppage of the fuel cell and the second indicator associated with a state wherein a purge has occurred during said stoppage of the fuel cell;
setting the second indicator when a purge operation is detected by the purge operation detection device during said stoppage of the fuel cell;
monitoring the state of the fuel cell by the monitoring device to determine whether the fuel cell is in a predetermined state if the first indicator is present, and not monitoring the state of the fuel cell if the second indicator is present;
opening the purge valve, opening the regulation valve, and initiating operation of the compressor upon opening the purge valve so as to purge a residual gas only after it is determined by the monitoring device that the fuel cell is in a the predetermined state.

* * * * *